(12) United States Patent
Watanabe et al.

(10) Patent No.: US 6,561,306 B2
(45) Date of Patent: May 13, 2003

(54) ELECTRIC STEERING APPARATUS

(75) Inventors: Masayuki Watanabe, Uji (JP); Yoshiaki Takagi, Kashihara (JP); Shingo Ougita, Kashihara (JP); Tomonori Sugiura, Kashiwara (JP); Kaname Joshita, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/729,988

(22) Filed: Dec. 6, 2000

(65) Prior Publication Data

US 2001/0002630 A1 Jun. 7, 2001

(30) Foreign Application Priority Data

Dec. 7, 1999 (JP) .......................... 11-348165

(51) Int. Cl.⁷ .................................. B62D 5/04
(52) U.S. Cl. .................. 180/444; 74/388 PS
(58) Field of Search ................. 180/443, 444, 180/446; 74/388 PS (56) References Cited

U.S. PATENT DOCUMENTS

| 5,002,404 | A | | 3/1991 | Zernickel et al. ........... 384/448 |
|---|---|---|---|---|
| 5,165,495 | A | | 11/1992 | Fujii ........................ 180/79.1 |
| 5,213,173 | A | * | 5/1993 | Konishi et al. ............. 180/444 |
| 5,284,219 | A | * | 2/1994 | Shimizu et al. ............. 180/444 |
| 5,445,237 | A | * | 8/1995 | Eda et al. .................. 180/444 |
| 5,819,871 | A | * | 10/1998 | Takaoka ..................... 180/444 |
| 5,836,419 | A | * | 11/1998 | Shimizu et al. ............. 180/443 |
| 5,927,429 | A | * | 7/1999 | Sugino et al. .............. 180/444 |
| 5,971,094 | A | * | 10/1999 | Joshita ..................... 180/444 |
| 5,988,311 | A | * | 11/1999 | Kuribayashi et al. ....... 180/443 |
| 6,000,491 | A | * | 12/1999 | Shimizu et al. ............. 180/444 |
| 6,155,377 | A | * | 12/2000 | Tokunaga et al. ........... 180/446 |
| 6,357,313 | B1 | | 3/2002 | Appleyard ................. 74/388.5 |
| 6,367,577 | B2 | * | 4/2002 | Murata et al. .............. 180/446 |
| 6,470,993 | B1 | | 10/2002 | Matsuda et al. ............ 180/444 |

\* cited by examiner

Primary Examiner—Lesley D. Morris
Assistant Examiner—L. Lum
(74) Attorney, Agent, or Firm—Birch, Stewart, Kolasch & Birch, LLP (57) ABSTRACT

An electric steering apparatus designed to eliminate backlash by enabling a hypoid pinion 7, which operates with rotation of a steering assisting motor, to swing with a bearing as a fulcrum and deflecting the hypoid pinion 7 in a radial direction by an elastic member 16. With this electric steering apparatus, it is possible to satisfactorily eliminate backlash without being affected by dimensional errors of parts such as gears used for assisting steering and to automatically eliminate backlash if it is caused by an increase of abrasion of teeth of the gears.

11 Claims, 5 Drawing Sheets

ELECTRIC STEERING APPARATUS

BACKGROUND OF THE INVENTION

The present invention relates to an electric steering apparatus using a motor as a source of generating a steering assist force.

An automobile is steered by transmitting a rotational operation of a steering wheel disposed inside the compartment of the vehicle to a steering mechanism provided outside of the compartment for steering-control wheels (in general, front wheels).

Figure 1:
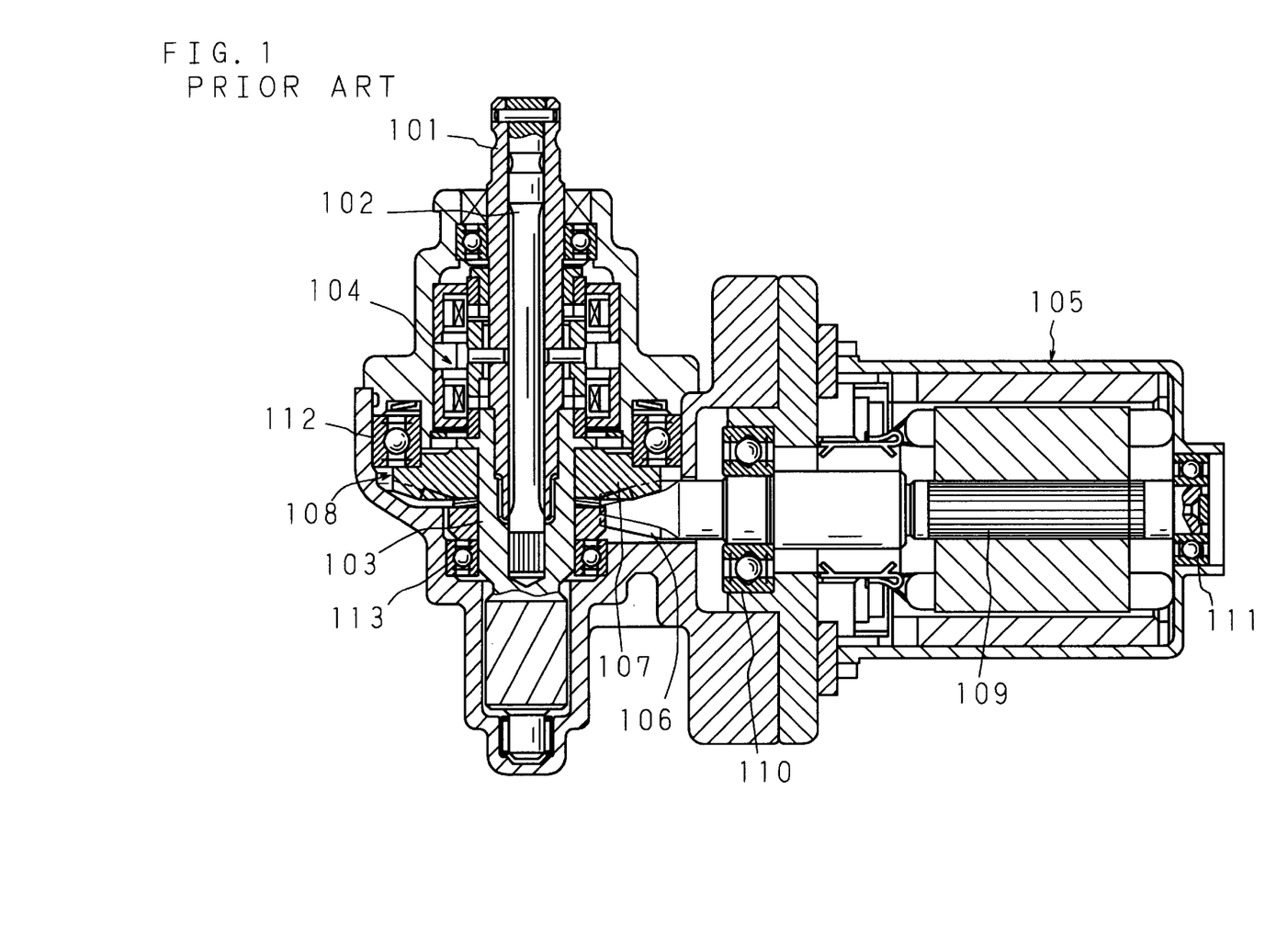
FIG. 1 is a cross-sectional view of an electric steering apparatus according to a conventional example.

FIG. 1 is a cross-sectional view of an electric steering apparatus according to a conventional example.

As illustrated in FIG. 1, an electric steering apparatus for an automobile comprises a first steering shaft 101 connected to a steering wheel; a torque sensor 104 for detecting a steering torque by relative displacement in a rotating direction between the steering shaft 101 and a second steering shaft 103 connected to the steering shaft 101 through a torsion bar 102; and a reduction mechanism 108 including a hypoid pinion 106 for increasing a torque of a steering assisting motor 105 driven based on a torque detected by the torque sensor 104 and for transmitting the increased torque to the steering shaft 103 and a hypoid wheel 107 meshing with the hypoid pinion 106, and is arranged to assist the operation of the steering mechanism corresponding to the rotation of the steering wheel by rotation of the motor 105 so as to reduce a driver's labor for steering.

The hypoid pinion 106 is integrally coupled to one end portion of a rotating shaft 109 of the motor 105. Moreover, movement of the hypoid pinion 106 in a radial direction and in an axial direction is inhibited by a pair of bearings 110 and 111 supporting both end portions of the rotating shaft 109, while a pair of bearings 112 and 113 prevent the second steering shaft 103 to which the hypoid wheel 107 is attached from moving in a radial direction and in an axial direction.

By the way, in the case where the hypoid pinion 106 and hypoid wheel 107 are used, the clearance between the teeth of the hypoid pinion 106 and hypoid wheel 107 is initially set in assembling. At this initial setting, a variation of the clearance between the teeth is caused by dimensional errors of parts, such as the hypoid pinion 106, bearings 110 through 113, hypoid wheel 107 and second steering shaft 103, and the accuracy of the crossing angle in assembling. Consequently, backlash occurs after the assembling, and noise caused by this backlash will be heard inside the compartment of the automobile.

Further, with the progress in an increase of the power of the steering assist force in resent years, the abrasion of the teeth of the hypoid pinion 106 and hypoid wheel 107 increases and a problem arises that occurrence of the above-mentioned backlash is unavoidable. In this case, since the movements of the hypoid pinion 106 and hypoid wheel 107 are inhibited, the backlash can not be adjusted and consequently noise caused by the backlash will be heard inside the compartment of the automobile.

BRIEF SUMMARY OF THE INVENTION

An object of the present invention is to provide an electric steering apparatus capable of solving the above problems.

An electric steering apparatus according to the first invention is an electric steering apparatus for assisting steering by rotation of a motor, comprising: a driving gear provided on a supporting shaft which operates with rotation of the motor for assisting steering; a driven gear meshing with the driving gear; a steering shaft to which the driven gear is provided; and a first bearing for supporting the supporting shaft; and characterized in that the driving gear can deflect in the radial direction, and deflecting means for deflecting the driving gear in its deflecting direction is comprised.

An electric steering apparatus according to the second invention is characterized, in addition to the first invention, in that the deflecting means includes an elastic member having at least three protrusions for energizing the driving gear in the deflecting direction from at least three positions along a circumferential direction.

An electric steering apparatus according to the third invention is characterized, in addition to the first invention, in that the driving gear is able to swing with the first bearing as a fulcrum.

An electric steering apparatus according to the fourth invention is characterized, in addition to the third invention, in that the deflecting means includes an elastic member having at least three protrusions for energizing the driving gear in the deflecting direction from at least three positions along a circumferential direction.

An electric steering apparatus according to the fifth invention is characterized, in addition to the third invention, in that the supporting shaft is a rotating shaft of the motor, and one end portion of the supporting shaft is supported so that it is able to swing with the first bearing as a fulcrum, the other end portion of the supporting shaft of the motor is supported by a second bearing which is deflectable in a radial direction, and the driving gear is integrally coupled to the one end portion of the rotating shaft.

An electric steering apparatus according to the sixth invention is characterized, in addition to the fifth invention, in that the deflecting means is interposed between the second bearing and a housing for holding the second bearing.

An electric steering apparatus according to the seventh invention is characterized, in addition to the fifth invention, in that the deflecting means includes an elastic member having at least three protrusions for energizing the driving gear in the deflecting direction from at least three positions along a circumferential direction.

An electric steering apparatus according to the eighth invention is characterized, in addition to the third invention, in that both end portions of the rotating shaft of the motor are supported by a pair of third bearings, and the driving gear is coupled to one end portion of the rotating shaft through a universal joint.

An electric steering apparatus according to the ninth invention is characterized, in addition eighth invention, in that the deflecting means includes an elastic member having at least three protrusions for energizing the driving gear in the deflecting direction from at least three positions along a circumferential direction.

An electric steering apparatus according to the tenth invention is characterized, in addition to the eighth invention, in that the driving gear is supported by a fourth bearing interposed between the first bearing and the universal joint so that it is deflectable in a radial direction, and the deflecting means is an elastic member for energizing the fourth bearing in its deflecting direction.

An electric steering apparatus according to the eleventh invention is characterized, in addition to the first invention, by further comprising fifth and sixth bearings made of iron for limiting movement of the driven gear in an axial direction; and an elastic member, interposed between the fifth bearing and a housing made of aluminum into which the fifth and sixth bearings are fitted, for energizing the fifth bearing toward the driven gear, and in that the driven gear is formed by using a hypoid wheel.

According to the first invention, since the driving gear can be deflected toward the driven gear by the deflecting means, it is possible to satisfactorily eliminate backlash without being affected by dimensional errors of parts such as the driving gear and the accuracy of the crossing angle in assembling and to improve the yield. Moreover, even when the meshing state of the driving gear and driven gear changes with time because of abrasion of the teeth of the driving gear and driven gear due to steering, it is possible to satisfactorily eliminate backlash and to prevent noise from being generated by backlash and heard inside the compartment of an automobile.

According to the third invention, in the first invention, it is possible to eliminate backlash without changing the supporting point of the driving gear.

According to the fifth invention, in the third invention, even when the driving gear is hypoid pinion integrally coupled to one end portion of the rotating shaft of the motor as the supporting shaft, it is possible to swing the driving gear in a simple manner.

According to the sixth invention, in the fifth invention, the rotating shaft rotates a slightly clockwise centering with the first bearing because the second bearing is energized downwardly. Accordingly, the driving gear provided on the left end portion of the rotating shaft is energized upwardly and can securely mesh with the driven gear.

According to the eighth invention, in the third invention, since the center of rotation of the driving gear and that of the rotating shaft can be arranged to cross each other, even when the deflection of the driving gear increases, it is possible to eliminate backlash while retaining the rotating characteristic of the driving gear.

According to the tenth invention, in the eighth invention, since the driving gear is energized via the fourth bearing, it is possible to satisfactorily retain the rotating characteristic of the driving gear and satisfactorily prevent positional displacement of the meshing point of the driving gear and driven gear.

According to the second, fourth, seventh and ninth inventions, in the first, third, fifth and seventh inventions, it is possible to apply the elastic restoring forces of the protrusions to the driving gear via the bearing and energize the driving gear toward the driven gear. Therefore, even when the meshing state of the driving gear and driven gear changes with time because of dimensional errors of parts such as the driving gear and abrasion of the teeth of the driving gear and driven due to steering, it is possible to automatically eliminate the clearance between the driving gear and driven gear and to satisfactorily eliminate backlash. In addition, when number of the protrusion is one or two, accurate assembling becomes hard, so that it is becomes hard to prevent the positional displacement of the meshing point of the driving gear and driven gear.

Moreover, since at least three protrusions come into contact with the bearing and energize the bearing from at least three positions along a circumferential direction, it is possible to satisfactorily prevent positional displacement of the meshing point of the driving gear and driven gear. Furthermore, even when a rotational torque applied to the meshing point of the driving gear and driven gear generates a force for separating the driving gear from the driven gear, the movement of the bearing with respect to the elastic member can be limited by the intermediate protrusions, thereby preventing the bearing from coming into contact with the elastic member and generating noise.

According to the eleventh invention, in the first invention, even when the ambient temperature of the driven gear increases and the clearance between the housing and the bearing in the axial direction increases because of the difference in the coefficient of thermal expansion between the housing made of aluminum and the bearing made of iron, the movement of the bearing and driven gear in the axial direction due to this clearance can be satisfactorily limited by the elastic member, thereby automatically eliminating the clearance between the driving gear and driven gear and satisfactorily eliminating backlash.

The above and further objects and features of the invention will more fully be apparent from the following detailed description with accompanying drawings.

DETAILED DESCRIPTION OF THE INVENTION

The following description will explain the present invention with reference to the drawings illustrating the embodiments thereof.

Embodiment 1

Figure 2:
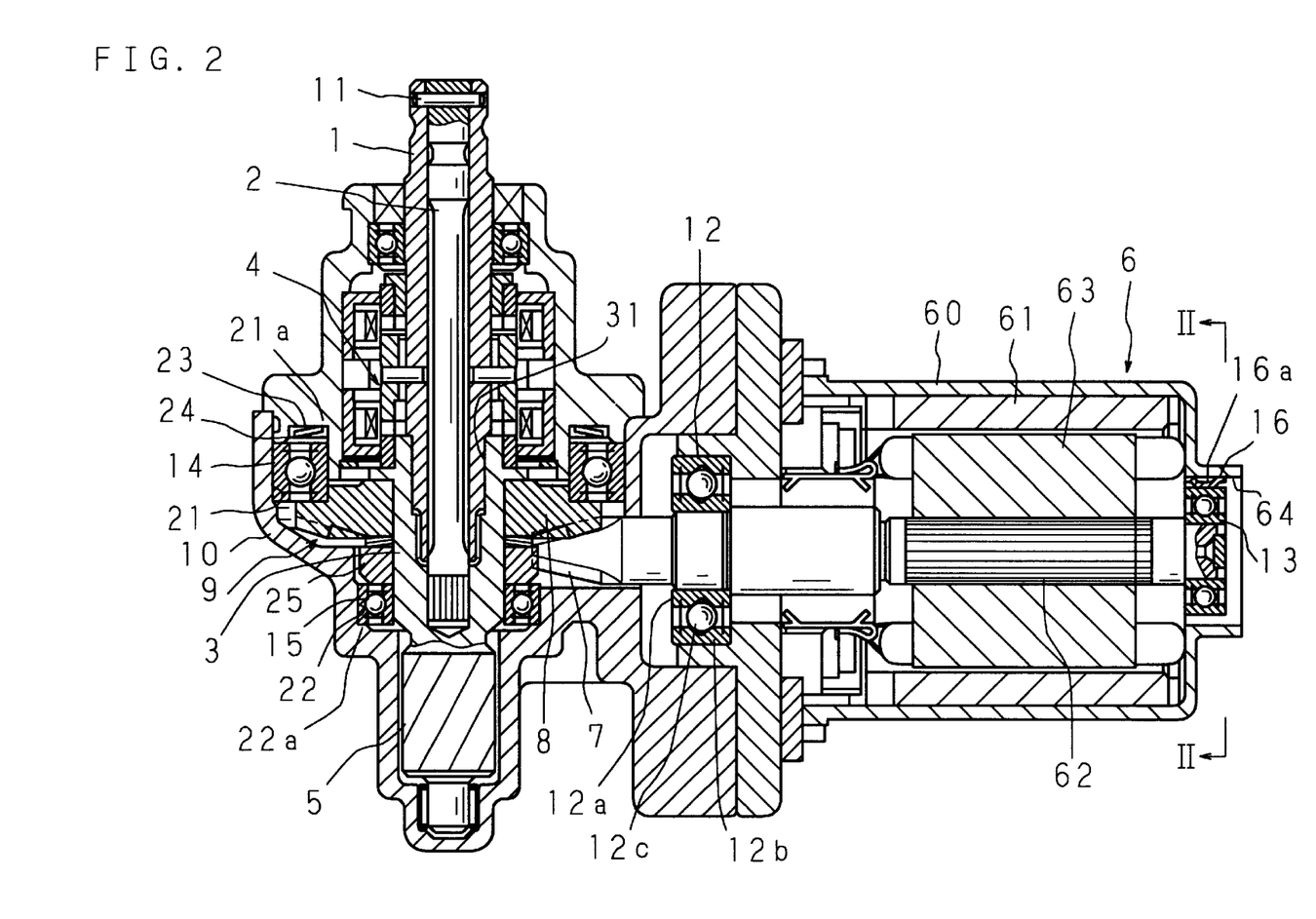
FIG. 2 is a vertical cross-sectional view showing the structure of an electric steering apparatus according to the present invention.
Figure 3:
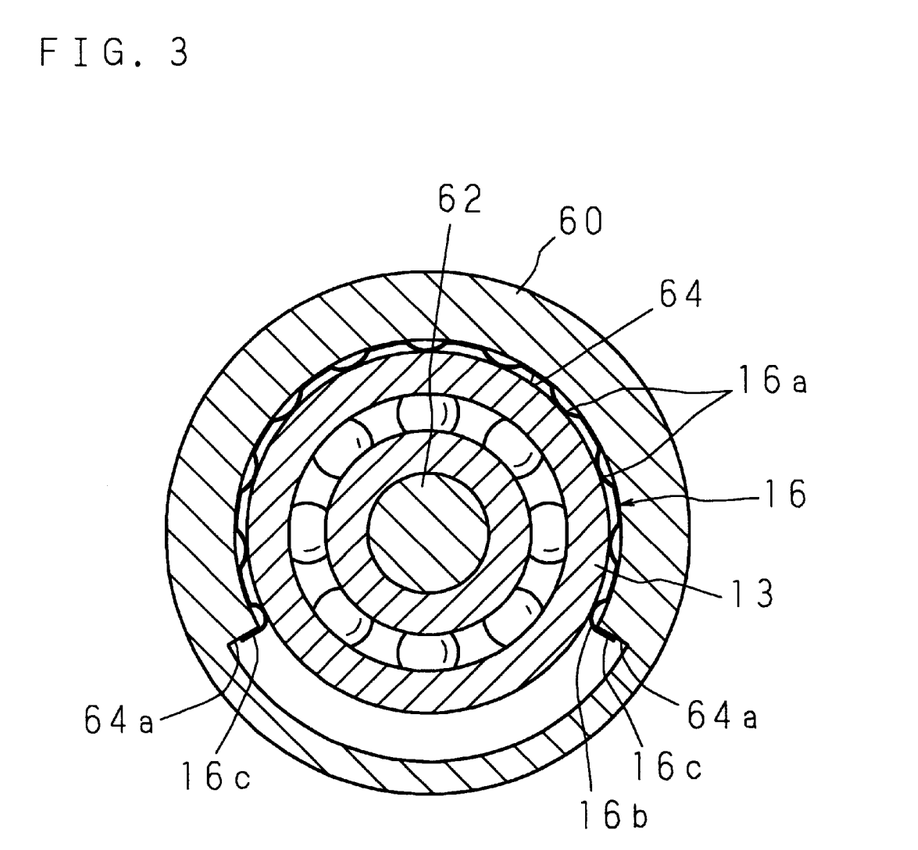
FIG. 3 is a cross-sectional view taken along the line II—II of FIG. 2.

FIG. 2 is a vertical cross-sectional view showing the structure of an electric steering apparatus according to the present invention, and FIG. 3 is a cross-sectional view taken along the line II—II of FIG. 2.

The electric steering apparatus comprises a first steering shaft 1 whose upper end portion is connected to a steering wheel (not shown), a torque sensor 4 for detecting a steering torque by relative rotational displacement between the steering shaft 1 and a second steering shaft 3 connected to the steering shaft 1 through a torsion bar 2, a pinion 5 for transmitting a torque of the second steering shaft 3 to a steering mechanism, a steering assisting motor 6 controlled based on a torque detected by the torque sensor 4, a reduction mechanism 9 including a driving gear 7 for transmitting a rotation of the motor 6 to the second steering shaft 3 and a driven gear 8 meshing with the driving gear 7, and a housing 10 which contains the reduction mechanism 9 and torque sensor 4 and supports the steering shaft 1 and 3, wherein the motor 6 is attached to the housing 10.

The first steering shaft 1 is formed in a cylindrical shape, and the torsion bar 2 is inserted into the hole of the steering shaft 1. The upper end portion of the torsion bar 2 and the upper end portion of the steering shaft 1 are connected with a dowel pin 11, and the torque sensor 4 is positioned around the steering shaft 1.

The second steering shaft 3 has a fitting hole 31 in its upper end portion, and the pinion 5 is provided in its lower end portion. The lower end portion of the steering shaft 1 is fitted into the fitting hole 31 of the second steering shaft 3 so as to allow relative rotation, and the lower end portion of the torsion bar 2 is spline-fitted into the fitting hole 31.

The motor 6 includes a cylindrical stator 61 fixed inside a cylindrical motor housing 60 attached to the housing 10, and a rotator 63 having a rotating shaft 62 whose both end portions are rotatably supported in the motor housing 60 through first and second bearings 12 and 13 formed by using ball bearings, respectively, and is rotatably disposed inside the stator 61, wherein the driving gear 7 is integrally coupled to one end portion of the rotating shaft 62.

This driving gear 7 is formed by using a hypoid pinion disposed to cross the axis of the second steering shaft 3, while the driven gear 8 is formed by using a hypoid wheel. This driven gear 8 is fitted around the middle of the steering shaft 3, and its movement in an axial direction is limited by a pair of bearings 14 and 15 disposed on both sides of the driven gear 8 in the axial direction.

For the first bearing 12, a self-aligning ball bearing with an inner ring 12a and outer ring 12b whose contact surface with a rolling member 12c is formed in a V-shaped cross section is used. The first bearing 12 supports the driving gear 7 and one end portion of the rotating shaft 62.

The second bearing 13 is held in a fitting hole 64 of the motor housing 60 so that it has room for deviation in a radial direction. An elastic member 16 for deflecting the second bearing 13 in a radial direction from a plurality of positions along a circumferential direction is provided between second bearing 13 and fitting hole 64.

This elastic member 16 is a commercially available product with the trade name "Tolerance Ring" (available from Rencol Tolerance Rings Co., Ltd.), and includes a plurality of protrusions 16a, each of which can be deformed elastically and has a semi-circular cross section, arranged at predetermined intervals between both end portions of a thin metal plate having elasticity, such as a flat spring. The protrusions 16a are formed in a protruding shape substantially orthogonal to both side portions between both end portions of the metal plate while keeping the both side portions. Alternatively, the protrusions 16a may be formed in a shape protruding toward both side edges without keeping the both side portions, or may be formed in a substantially V-shaped cross section as well as a semi-circular cross section. When this elastic member 16 is positioned between the second bearing 13 and fitting hole 64, it is entirely curved, substantially all the protrusions 16a come into contact with the second bearing 13, and the second bearing 13 is forced downwardly. Responding to this, the rotating shaft 62 pivots slightly clockwise about the first bearing (self-aligning bearing) 12. Accordingly, the driving gear 7 provided on the left end portion of the rotating shaft 62 is forced upwardly and can securely mesh with the driven gear 8.

The elastic member 16 is formed in a length of about two thirds of a circumference, i.e., a length that causes the elastic member 16 to form a curve of about 240°, positioned so that its notch portion 16b with a length of about one third of the circumference is located on the deflecting side of the second bearing 13, and deflects the second bearing 13 from positions along the circumferential direction between both end portions thereof. Moreover, bent pieces 16c, 16c are provided to both end portions of the elastic member 16. When the bent pieces 16c, 16c engage with a pair of engaging portions 64a, 64a provided in the fitting hole 64, they limit movement of the elastic member 16 in the circumferential direction.

In Embodiment 1, the driving gear 7 is supported together with the rotating shaft 62 by the self-aligning first bearing 12 so that it is able to slightly move upwardly toward the driven gear 8, and the other end portion of the rotating shaft 62 is supported through the second bearing 13 and elastic member 16 so that it can deflectable in a radial direction. Accordingly, the rotating shaft 62 and driving gear 7 pivot about the first bearing 12 when forced by the elastic member 16, and the driving gear 7 comes into contact with the driven gear 8, thereby eliminating the clearance between the driving gear 7 and the driven gear 8. It is therefore possible to satisfactorily eliminate backlash without being affected by dimensional errors of parts, such as the driving gear 7, and the accuracy of the crossing angle in assembling and to improve the yield.

The incorporated elastic member 16 for causing the driving gear 7 to move toward the driven gear 8 can deflect the second bearing 13 downwardly stably and accurately because substantially all of the protrusions 16a thereof come into contact with the second bearing 13 and deflect the second bearing 13 from positions along a circumferential direction within a range of about 240°. As a result, positional displacement of the meshing point of the driving gear 7 and driven gear 8 can be satisfactorily prevented. Moreover, even when a rotational torque applied to the meshing point of the driving gear 7 and driven gear 8 generates a force for separating the driving gear 7 from the driven gear 8, the movement of the second bearing 13 with respect to the elastic member 16 can be limited by the intermediate protrusions 16a, thereby preventing the second bearing 13 from coming into contact with the elastic member 16 and generating noise.

In addition, when number of the protrusions 16a is one or two, accurate assembling becomes hard, so that it becomes hard to prevent the positional displacement of the meshing point of the driving gear 7 and driven gear 8.

Furthermore, since the protrusions 16a of the elastic member 16 cause the rotating shaft 62 and driving gear 7 to pivot about the first bearing 12 via the second bearing 13, even when the meshing state of the driving gear 7 and driven gear 8 changes with time because of an increase of the abrasion of the teeth of the driving gear 7 and driven gear 8, it is possible to eliminate the clearance between the driving gear 7 and driven gear 8 by the elastic restoring forces of the protrusions 16a.

Embodiment 2

Figure 4:
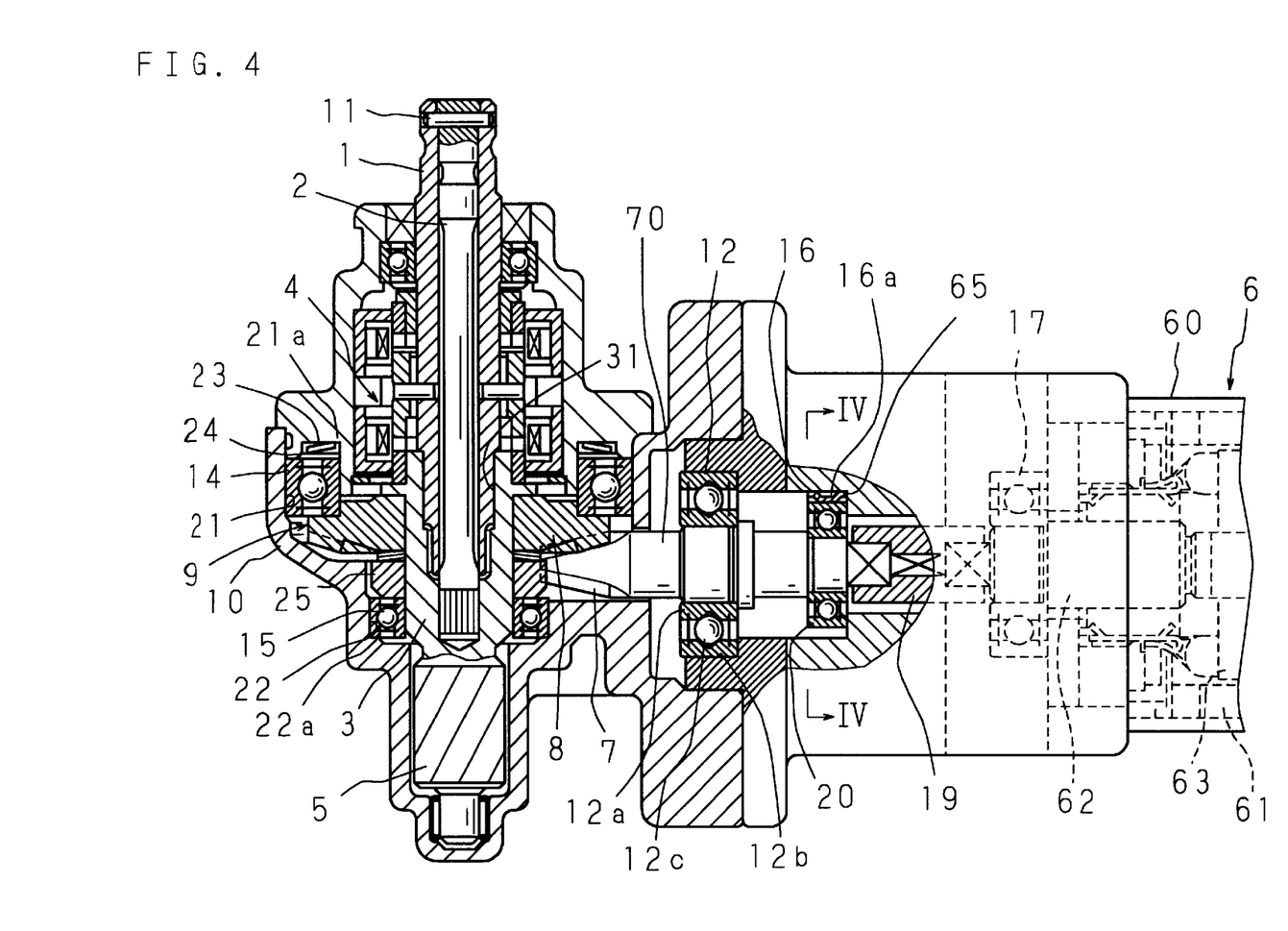
FIG. 4 is a vertical cross-sectional view showing the structure of Embodiment 2 of an electric steering apparatus according to the present invention.
Figure 5:
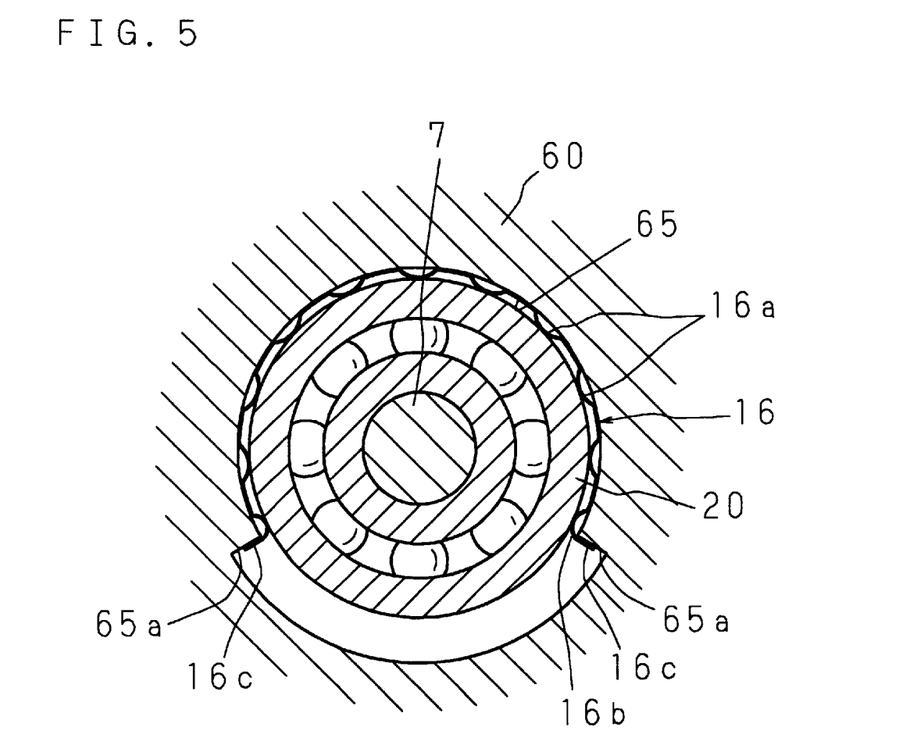
FIG. 5 is a cross-sectional view taken along the line IV—IV of FIG. 4.

FIG. 4 is a vertical cross-sectional view showing the structure of Embodiment 2b of the present invention, and FIG. 5 is a cross-sectional view taken along the line IV—IV of FIG. 4.

Instead of pivoting the rotating shaft 62 whose one end portion is integrally coupled to the driving gear 7, an electric steering apparatus of Embodiment 2 separates the driving gear 7 from the rotating shaft 62, supports both end portions of the rotating shaft 62 by a pair of third bearings 17, 17 (only one of which is shown), couples the driving gear 7 provided on a supporting shaft 70 with one end portion of the rotating shaft 62 through a universal joint 19 formed by using an Oldham coupling, supports the supporting shaft 70 by the self-aligning first bearing 12 and a fourth bearing 20 which is disposed between the first bearing 12 and the universal joint 19 and formed by using a ball bearing, and disposes between the fourth bearing 20 and a fitting hole 65 into which the fourth bearing 20 is fitted the elastic member 16 for forcing the fourth bearing 20 in a radial direction from a plurality of positions along a circumferential direction.

The fitting hole 65 formed in the motor housing 60 is configured so that a radius from its outer side to the center becomes larger with in a range of about 120°, and this larger radius section's both end portions in the circumferential direction are provided with engaging portions 65a, 65a with which the bent pieces 16c, 16c of the elastic member 16 come into contact.

As described above, the elastic member 16 is formed in a length of about two thirds of a circumference, i.e., a length that causes the elastic member 16 to form a curve of about 240°, and disposed on the peripheral side of the fourth bearing 20 so that its notch portion 16b with a length of about one third of the circumference is located on the outer side, and the bent pieces 16c, 16c provided to both end portions of the elastic member 16 limit movement of the elastic member 16 in the circumferential direction by engagement with the pair of engaging portions 65a, 65a provided in the fitting hole 65.

Since other configurations and functions are the same as those of Embodiment 1, similar parts are designated with the same reference numerals, and the detailed explanation and the explanation of the functions are omitted.

In Embodiment 2, the supporting shaft 70 is supported by the self-aligning first bearing 12 and the fourth bearing 20 can be deviated in a radial direction so that it is able to slightly rotate, and coupled to one end portion of the rotating shaft 62 by the universal joint 19. Hence, the supporting shaft 70 pivots about the first bearing 12 when forced by the elastic member 16 disposed on the peripheral side of the fourth bearing 20, then the driving gear 7 provided on the supporting shaft 70 comes into contact with the driven gear 8, thereby eliminating the clearance between the driving gear 7 and the driven gear 8. It is therefore possible to satisfactorily eliminate backlash without being affected by dimensional errors of parts such as the driving gear 7 and to improve the yield.

The incorporated elastic member 16 for causing the driving gear 7 to move upwardly toward the driven gear 8 can satisfactorily prevent positional displacement of the meshing point of the driving gear 7 and driven gear 8 because substantially all of the protrusions 16a thereof come into contact with the fourth bearing 20 and force the fourth bearing 20 from positions along the circumferential direction within a range of about 240°. Moreover, even when a rotational torque applied to the meshing point of the driving gear 7 and driven gear 8 generates a force for separating the driving gear 7 from the driven gear 8, the movement of the fourth bearing 20 with respect to the elastic member 16 can be limited by the intermediate protrusions 16a, thereby preventing the fourth bearing 20 from coming into contact with the elastic member. 16 and generating noise.

Furthermore, since the protrusions 16a of the elastic member 16 cause the driving gear 7 to move upwardly toward the driven gear 8 via the fourth bearing 20, even when the meshing state of the driving gear 7 and driven gear 8 changes with time because of an increase of the abrasion of the teeth of the driving gear 7 and driven gear 8, it is possible to eliminate the clearance between the driving gear 7 and driven gear 8 by the elastic restoring forces of the protrusions 16a.

Incidentally, for the universal joint 19, it is possible to use an Oldham coupling having an engaging groove in a radial direction and an engaging protrusion that engages with the engaging groove in a joining portion with respect to each of the rotating shaft 62 and driving gear 7 or use other joint that can absorb the difference in the axis between the rotating shaft 62 and the driving gear 7, and the structure of the joint is not particularly limited.

Besides, in Embodiments 1 and 2, the elastic member 16 is formed in a length that causes the elastic member 16 to form a curve of about 240°, or may be formed in other length if the elastic member 16 is curved, for example, in a length that causes the elastic member 16 to form a curve of about 120°. Further, the elastic member 16 may be formed in a circular shape without providing a notch.

Embodiment 3

In an electric steering apparatus of Embodiment 3, fitting holes 21 and 22 into which the above-mentioned pair of bearings 14 and 15 disposed on both sides of the driven gear 8 in an axial direction are to be fitted and which have bearing seats 21a and 22a facing one end portion of the respective bearings 14 and 15, are formed in the above-mentioned housing 10 made of aluminum, the bearings 14 and 15 are fitted into these fitting holes 21 and 22, respectively, and an elastic member 23 for forcing the driven gear 8 toward the driving gear 7 is interposed between one end portion of one bearing 14 and the bearing seat 21a of one fitting hole 21. This elastic member 23 is formed by using a coned disc spring, and a washer 24 is interposed between the elastic member 23 and the driven gear 8.

The bearings 14 and 15 are formed by using ball bearings, and the inner ring of one bearing 14 is fitted in a fitting portion formed on the surface of one end portion of the driven gear 8, while the inner ring of the other bearing 15 is fitted around the: middle of the above-mentioned steering shaft 3. The movement of the driven gear 8 in the axial direction is limited by these bearings 14, 15, a spacer 25 interposed between the bearing 15 and driven gear 8, and the elastic member 23.

Since other configurations and functions are the same as those of Embodiments 1 and 2, similar parts are designated with the same reference numerals, and the detailed explanation and the explanation of the functions are omitted.

In Embodiment 3, since the elastic member 23 forces the driven gear 8 in an axial direction via the washer 24 and bearing 14, it is possible to satisfactorily limit the movement of the driven gear 8 in the axial direction. Moreover, when the ambient temperature of the driven gear 8 increases due to the outside air temperature and repeated steering assist, the fitting holes 21 and 22 become larger entirely because of the difference in the coefficient of thermal expansion between the formed aluminum housing 10 and the iron bearing 14, and consequently the fitting resistances of the bearings 14 and 15 fitted in the holes 21 and 22 are lost and the clearance between the bearing seat 21a and one end portion of the bearing 14 in the axial direction increases. However, since the bearing 14 is forced in the axial direction by the elastic member 23, it is possible to satisfactorily inhibit the movement of the driven gear 8 in the axial direction. It is therefore possible to eliminate backlash without being affected by a change in the ambient temperature of the driven gear 8.

Further, in Embodiments 1 and 2 described above, the driving gear 7 is moved in a radial direction by causing the driving gear 7 to pivot about the first bearing 12 as a fulcrum. Alternatively, it is possible to move the driving gear 7 in a radial direction without causing it to pivot about the first bearing 12 by, for example, arranging the above-mentioned first and second bearings 12, 13 or the first and fourth bearings 12, 20 to be deviated in a radial direction and by respectively deflecting these bearings 12, 13, 20 in a radial direction by the elastic member 16.

Besides, in Embodiments 1 and 2, while the elastic member 16 is used as resilient member, it is possible to move the driving gear 7 in a radial direction by other configuration, for example, via the second and fourth bearings 13 and 20 by forming in the motor housing 60 screw holes open into the fitting holes 64 and 65 into which the second and fourth bearings 13 and 20 are fitted, engaging screw members with the screw holes, and turning the screw members.

Moreover, the elastic member 16 as the resilient member may be a curved flat spring, coil spring or rubber member as well as a Tolerance Ring.

Furthermore, the reduction mechanism 9 in Embodiments 1 and 2 may be a driving gear 7 as a worm and a driven gear 8 as a worm wheel as well as a hypoid gear comprising a driving gear 7 as a hypoid pinion and a driven gear 8 as a hypoid wheel.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric steering apparatus for assisting steering by rotation of a motor, comprising:
   a driving gear provided on a supporting shaft which operates with rotation of said supporting shaft by said motor for assisting steering;
   a driven gear meshing with said driving gear;
   a steering shaft to which said driven gear is provided; and
   a first bearing for supporting said supporting shaft;
   wherein
   said driving gear can move in a radial direction,
   said electric steering apparatus further comprising a resilient member for deflecting said driving gear in the radial direction and
   said resilient member is located at the supporting shaft.

2. The electric steering apparatus as set forth in claim 1, wherein
   said resilient member includes an elastic member having at least three protrusions for deflecting said driving gear in the radial direction from at least three positions along a circumferential direction.

3. The electric steering apparatus as set forth in claim 1, wherein
   said driving gear is able to move radially with said first bearing as a fulcrum.

4. The electric steering apparatus as set forth in claim 3, wherein
   said resilient member includes an elastic member having at least three protrusions for deflecting said driving gear in the radial direction from at least three positions along a circumferential direction.

5. The electric steering apparatus as set forth in claim 3, wherein
   said supporting shaft is a rotating shaft of said motor, and one end portion of said supporting shaft is supported so that it is able to pivot about said first bearing as a fulcrum,
   the other end portion of said supporting shaft of said motor is supported by a second bearing which can deviate in a radial direction, and
   said driving gear is integrally coupled to the one end portion of said rotating shaft.

6. The electric steering apparatus as set forth in claim 5, wherein said resilient member is interposed between said second bearing and a housing for holding said second bearing.

7. The electric steering apparatus as set forth in claim 5, wherein
   said resilient member includes an elastic member having at least three protrusions for deflecting said driving gear in the radial direction from at least three positions along a circumferential direction.

8. The electric steering apparatus as set forth in claim 3, wherein
   both end portions of a rotating shaft of said motor are supported by a pair of third bearings,
   said driving gear is coupled to one end portion of the rotating shaft of said motor through a universal joint.

9. The electric steering apparatus as set forth in claim 8, wherein
   said resilient member includes an elastic member having at least three protrusions for deflecting said driving gear in the radial direction from at least three position along a circumferential direction.

10. The electric steering apparatus as set forth in claim 8, wherein
    said driving gear is supported by a fourth bearing interposed between said first bearing and said universal joint so that it can be deviated in a radial direction, and
    said resilient member is an elastic member for said fourth bearing in a radial direction of the fourth bearing.

11. The electric steering apparatus as set forth in claim 1, wherein said driven gear is formed by using a hypoid wheel, said electric steering apparatus further comprising:
    fifth and sixth bearings made of iron for limiting movement of said driven gear in an axial direction; and
    an elastic member, interposed between said fifth bearing and a housing made of aluminum into which said fifth and sixth bearings are fitted, for forcing said fifth bearing toward said driven gear.

* * * * *